United States Patent
Matrisian

[11] 3,976,240
[45] Aug. 24, 1976

[54] APPARATUS FOR APPLYING CONTACTS

[75] Inventor: Robert Michael Matrisian, New Cumberland, Pa.

[73] Assignee: E. I. Du Pont de Nemours and Company, Wilmington, Del.

[22] Filed: June 23, 1975

[21] Appl. No.: 589,542

Related U.S. Application Data

[62] Division of Ser. No. 404,791, Oct. 9, 1973, Pat. No. 3,926,357.

[52] U.S. Cl. .................... 228/5.1; 228/1; 228/15.1; 228/44.1 A; 219/103; 219/107
[51] Int. Cl.² .......................... B23K 1/20
[58] Field of Search ............ 228/110, 111, 1, 4.1, 228/4.5, 5.1, 19, 21, 43, 44.1, 14, 15.1, 47; 29/630 R; 219/103, 107, 85 F

[56] References Cited
UNITED STATES PATENTS

| | | | |
|---|---|---|---|
| 1,748,938 | 3/1930 | Austin et al. | 228/4.1 X |
| 3,114,828 | 12/1963 | Gannoe | 219/103 |
| 3,330,026 | 7/1967 | Best et al. | 228/5.1 X |
| 3,382,575 | 5/1968 | Gannoe | 219/107 X |
| 3,512,248 | 5/1970 | Nagy et al. | 228/110 X |
| 3,531,852 | 10/1970 | Slemmons et al. | 228/5.1 X |
| 3,600,794 | 8/1971 | Shibata et al. | 228/115 |
| 3,771,711 | 11/1973 | Lesyk et al. | 228/5.5 |
| 3,901,429 | 8/1975 | Boyer et al. | 228/5.5 |

*Primary Examiner*—Victor A. DiPalma

[57] ABSTRACT

An apparatus is provided for applying gold contacts to a metal member comprising an ultrasonic welding unit, a welding zone for receiving and superposing the foil element and metal member, a stripping plate disposed in the welding zone between the element and the member having an opening therein for superposing and welding the element and member. The gold foil element is welded to the metal member and the stripping plate separates the unwelded portion of the gold foil from the welded portion to leave the welded portion of the gold foil attached to the metal member.

3 Claims, 12 Drawing Figures

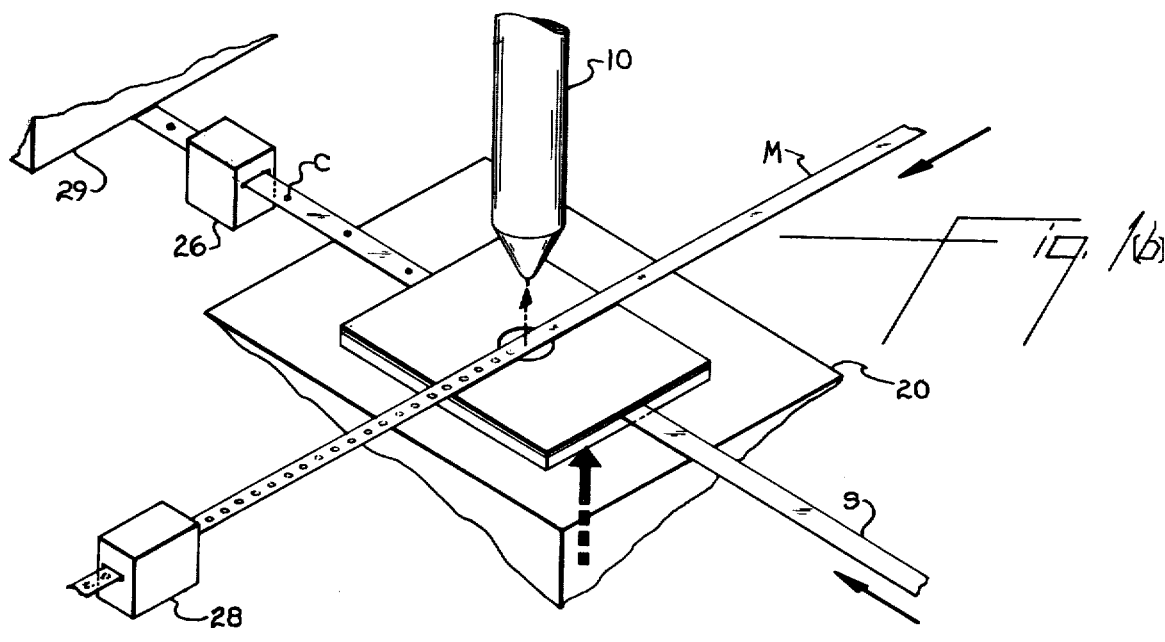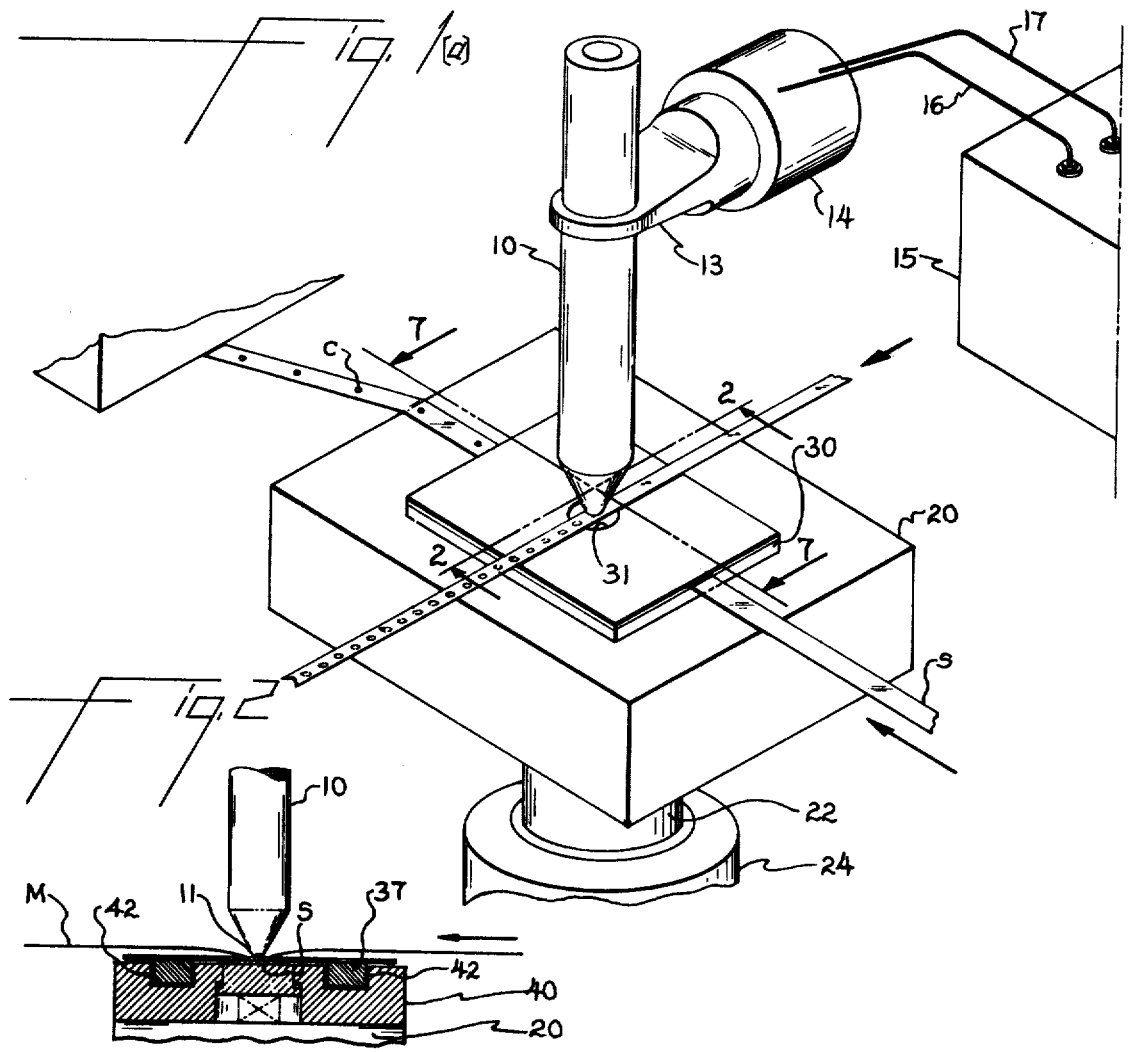

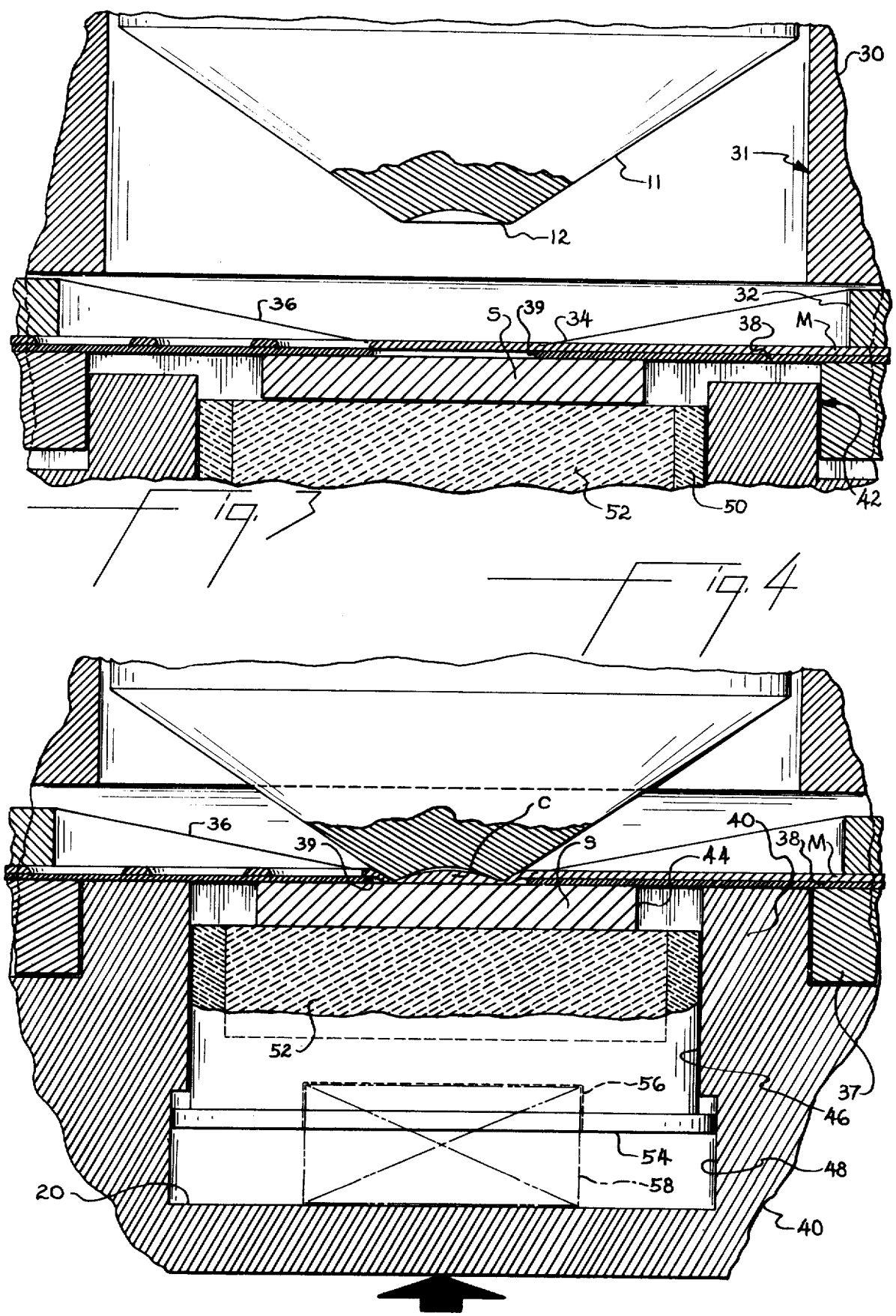

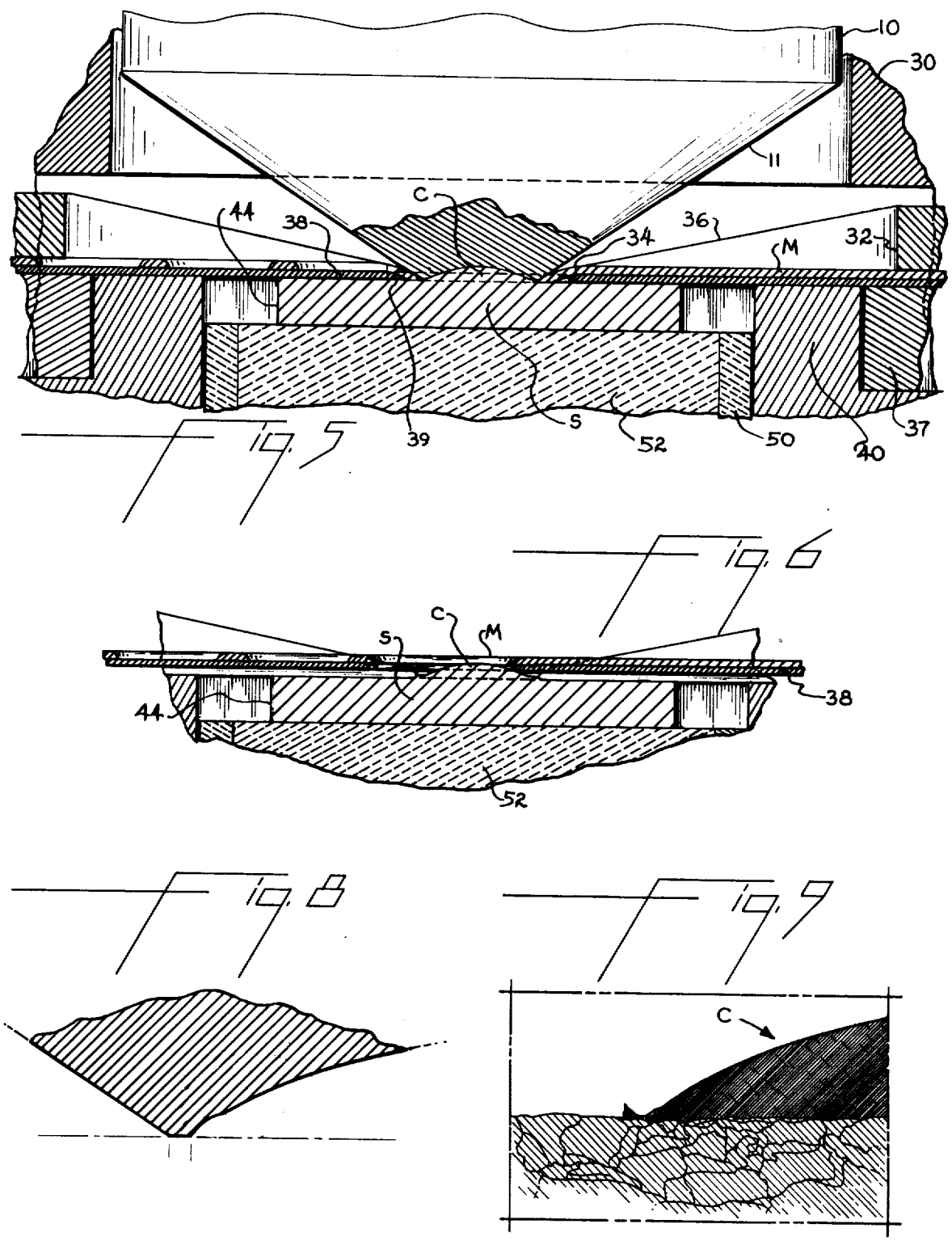

APPARATUS FOR APPLYING CONTACTS

CROSS REFERENCE TO RELATED APPLICATION

This application is a division of application Ser. No. 404,791, now U.S. Pat. No. 3,926,357, filed Oct. 9, 1973.

BACKGROUND OF THE INVENTION

1. Field of the Invention

This invention relates to an apparatus for fabrication of contacts for use with electrical circuits, and particularly relates to an apparatus for attaching an electrical contact to a metal member, and more particularly relates to an apparatus for welding a contact element to a metal member to produce an electrical contact suitable for fabricating electrical sockets or terminals.

2. Description of the Prior Art

Electrical sockets and terminals for establishing electrical contact are well known in the prior art. The general requirements for such sockets and terminals are that they have surfaces for establishing electrical contact and resisting corrosion and wear. It is well known to gold plate the interior surfaces of a socket or the outer surface of a terminal to insure good electrical contact. However, the gold plating process of the prior art is both expensive and inefficient. Whether the strip material from which the sockets or terminals are to be fabricated is coated on one or both sides, the amount of gold applied to the surface is greater than is actually required for establishing good electrical contact. In an effort to decrease the amount of gold used and to insure good electrical contact between sockets and terminals, either the sockets or terminals or both have been fabricated from base metal strips having a small raised gold contact or dot welded on what is to become the contact surface of the socket or terminal. Although this latter type of socket or terminal provides for substantial economy in conserving the amount of gold required for providing electrical contact in sockets and terminals, it requires either substantial manual processing operations or complex and expensive automatic equipment. Various apparatus for welding electrical contacts to strip stock are described in U.S. Pat. Nos. 3,114,828; 3,299,246 and 3,382,575. All the aforementioned apparatus include mechanical cutters for severing the welded contact from the strip material. Another method and apparatus using ultrasonic welding techniques is disclosed in U.S. Pat. No. 3,357,909, and uses a flame to cut a wire welded to a stock member.

SUMMARY OF THE INVENTION

According to the present invention, there is provided an apparatus for attaching an element to a metal member, comprising, a welding zone for receiving a metal element and a metal member and superposing the metal element with the metal member, means for welding a selected portion of the metal element to the metal member, and means for stripping the unwelded portion of the metal member and leaving the welded portion of the element attached to the metal member.

In a preferred embodiment of the apparatus of the invention, the means for stripping comprises a plate disposed between the metal element and the metal member. The plate having an opening for superposing the metal element with the metal member and welding a selected interior portion of the metal element to the metal member. The metal member, having a selected portion of the metal element welded thereto, is advanced from the welding station. The unwelded portion of the metal element is stripped from the welded portion by the stripping plate between the element and the member.

The apparatus of the invention provides for reliably attaching a contact to a metal member from which sockets or terminals may then be fabricated by conventional techniques well known in the prior art. The apparatus of the invention provides for substantial economy by eliminating complex apparatus or manual operations for cutting or burning the contact source material from the metal member to which it is attached. Additionally, machining steps required to render the contact surface uniform for later use are also eliminated. Further, the expensive contact source material, e.g., gold, not attached to the metal stock member but stripped therefrom can be readily recycled for subsequent use.

BRIEF DESCRIPTION OF THE DRAWINGS

FIGS. 1a and b are perspective drawings of a preferred embodiment of an apparatus of the invention.

FIG. 2 is an elevation drawing of the embodiment of the invention of FIG. 1 borken away and in partial section along line 2—2 of FIG. 1.

FIGS. 3–6 are detailed drawings in cross-section illustrating the action of the stripping plate in the direction of travel of the metal foil element.

FIG. 8 is an elevation drawing in cross-section and broken away to illustrate the recess in the welding head.

FIG. 9 is a cross-section partially broken away illustrating a contact dot prepared according to the invention.

DETAILED DESCRIPTION OF A PREFERRED EMBODIMENT

Figure 7A:
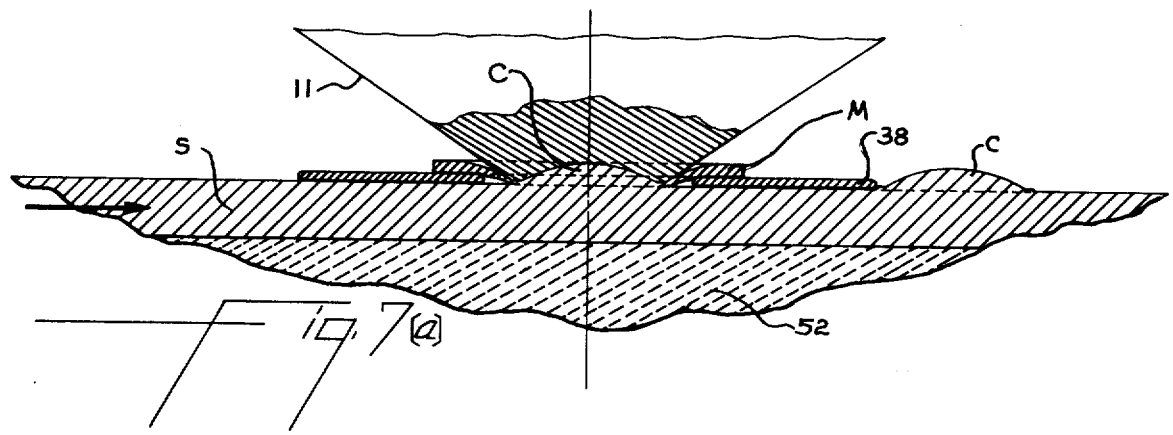
FIGS. 7a, b and c are detailed drawings broken away and in cross-section illustrating the action of the stripping plate in the direction of travel of the metal strip member.
Figure 7B:
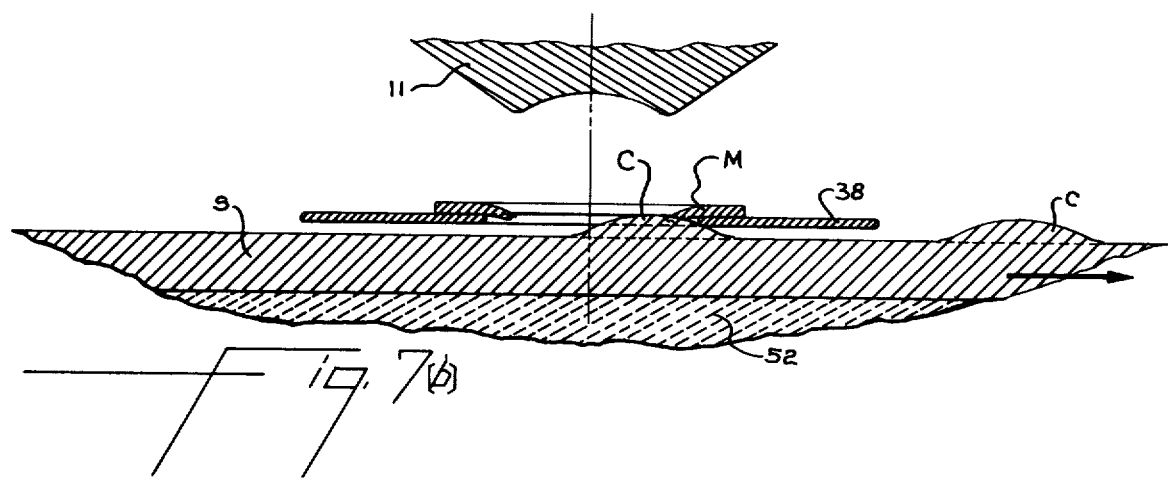
Figure 7C:
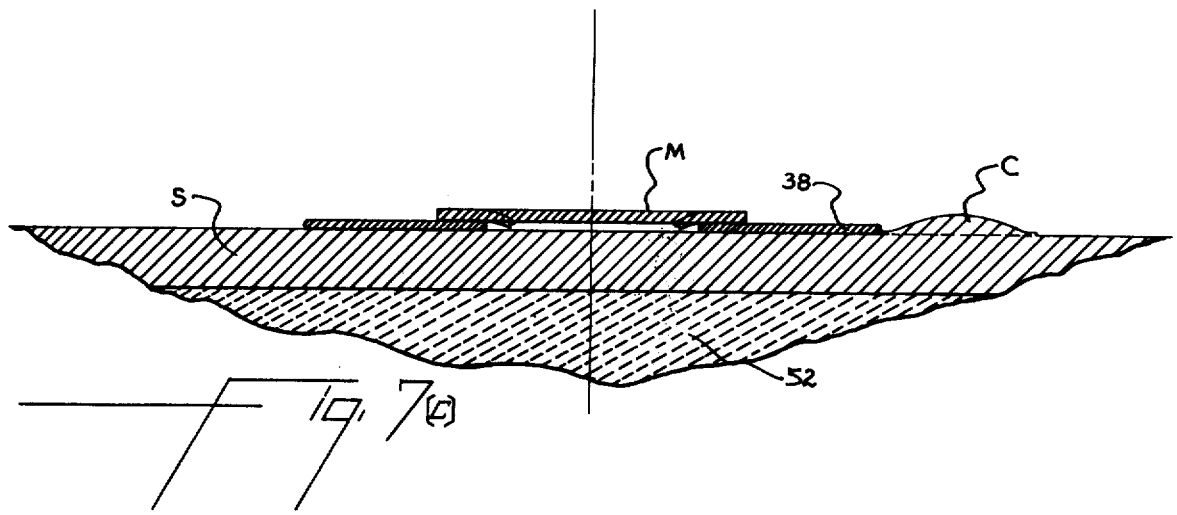

The apparatus of the invention is described with reference to the attached drawings wherein the same numerals are used throughout the figures to identify the same elements.

The apparatus of the invention comprises an ultrasonic welding unit 10 having a conical lower section or horn 11 terminating in a recessed circular tip 12. The welding unit 10 is mounted in a bracket 13 connected to member 14 which is suitably mounted on a housing provided for the apparatus but not shown. An ultrasonic power source 15 is connected to member 14 by wires 16 and 17.

Table 20 is actuatibly mounted on piston rod 22 of an air cylinder 24 fixedly mounted on a housing (not shown) for the apparatus. Contact material M and strip member S are conventionally supplied to a welding zone in superposed relationship and advanced therefrom by suitable advance mechanisms 26, 28. Strip member having contacts C attached thereto can be wound on rolls or supplied directly to other automatic equipment for fabricating sockets or terminals.

The welding station zone on table 20 comprises a plate 30 having a cylindrical opening 31 therein for receiving the conical welding horn 11 of the ultrasonic welding unit 10. Plate 32 has a frusto-conical open section 36 terminating in opening 34 in the welding zone for receiving the horn 11 with welding tip 12. The contact foil material M is threaded between plate 32 and stripping plate 38. Stripping plate 38 has circular opening 39 for superposing and welding contact material M on the strip member S. The stripping plate 38 has edge members 37 for allowing the plate to float with respect to the strip member S.

Plate 40, having channels 42 for receiving the edge members 37 of the stripping plate 38, is mounted on table 20. Plate 40 has a longitudinal channel 44 therein for receiving the strip material S, and a circular channel 46 having expanded section 48 in communication with channel 44.

A weld backing member 50, having a suitable replaceable insert member 52 and a flange member 54, is mounted in cylindrical recess 46 with the flange 54 in the expanded cylindrical section 48. Member 50 is spring loaded by spring 58.

The operation of the apparatus may be readily understood with reference to the drawings and particularly FIGS. 3–6 and FIGS. 7a, b and c. The strip material S to which the contact is to be attached is threaded through channel 44 of plate 40. The upper surface of the strip material S is held against the stripping plate 38 by the spring loaded weld backing member 50. The contact material, preferably a gold foil, is threaded between stripping plate 38 and plate 32, having opening 34 in the welding zone. In the preferred embodiment of the apparatus strip material S is step fed in a first direction and the contact material M is step fed in a second direction perpendicular to strip S. Air cylinder 24 is activated and piston rod 22 raises the table 20 until tip 12 of the ultrasonic welding unit 10 engages the contact material M. The welding unit 10 is energized and the superposed contact material M and strip material S in the welding zone is urged against tip 12 by the spring loaded member 50. Spring 58 is selected to provide a suitable welding force between tip 12 of the welding horn 11, and the contact material M and strip material S in the welding zone. When the weld is completed, air cylinder 24 is deactivated and table 20 lowered. The strip member S is advanced in one direction by advance means 29 and the contact material is advanced in a second direction perpendicular thereto by advance means 28. The stripping plate 38 functions to stress the contact material outside the area of the weld.

The contact material is stressed and begins to separate from the portion welded to the strip member S. The contact element C lifts the floating stripping plate. The stripping plate 38 stresses the contact material along the perimeter outside the area of the weld, until the entire perimeter of the contact material outside the welded area is separated from the contact element C welded to the carrier strip S.

The resultant contact element is shown in detail in cross-section in FIG. 9. The nonuniform perimeter edge of contact element results from the stress separating of the contact material.

In the preferred embodiment of the invention, the contact material M is preferably a thin gold foil. The strip member S may be any conventional metal suitable for fabricating sockets, terminals or other electrical contact members. However, the particular materials useful in the invention are not so limited. For example, any element which can be soldered to any other member may be used. Similarly, the invention is not limited to preparation of contacts for electrical circuits, but may be used for attaching elements on members for other purposes. In view of variations, equivalents and modifications to the invention which will be obvious to others skilled in the art, the invention is not intended to be limited except by the appended claims.

What is claimed is:

1. An apparatus for attaching a foil element to a member comprising,
   a plate floatingly disposed in a welding zone for receiving a foil element and a member on opposite sides of the plate, said plate having an opening therein for superposing an interior portion of the foil element with the member,
   means for welding a selected portion of the foil element to the member in said welding zone through the opening in said plate, and
   means for advancing the foil element and the member from the welding zone thereby stripping the unwelded portion of the foil element against the opening in said plate to leave the welded portion attached to the member.

2. An apparatus, according to claim 1, wherein said means for welding comprises an ultrasonic welding unit having a recessed circular welding tip.

3. An apparatus as recited in claim 1, additionally including a spring loaded weld backing plate for urging the foil element and the member against said welding tip.

* * * * *